(12) United States Patent
Palmer et al.

(10) Patent No.: US 7,190,959 B2
(45) Date of Patent: Mar. 13, 2007

(54) METHODS AND SYSTEMS FOR SIGNALING IN A COMMUNICATIONS NETWORK FOR PORTED, MIGRATED AND/OR DUAL-MODE SUBSCRIBERS

(75) Inventors: Jonathan James Palmer, Durham, NC (US); Raghavendra Gopala Rao, Cary, NC (US); Devesh Agarwal, Raleigh, NC (US)

(73) Assignee: Tekelec, Morrisville, NC (US)

( * ) Notice: Subject to any disclaimer, the term of this patent is extended or adjusted under 35 U.S.C. 154(b) by 154 days.

(21) Appl. No.: 10/992,879

(22) Filed: Nov. 19, 2004

(65) Prior Publication Data

US 2006/0111116 A1    May 25, 2006

(51) Int. Cl.
*H04Q 7/20* (2006.01)
(52) U.S. Cl. ............... 455/445; 455/552.1; 455/428
(58) Field of Classification Search .......... 455/445, 455/552.1, 428, 415, 550.1
See application file for complete search history.

(56) References Cited

U.S. PATENT DOCUMENTS

| | | |
|---|---|---|
| 5,841,854 A | 11/1998 | Schumacher et al. |
| 5,862,481 A | 1/1999 | Kulkarni et al. |
| 5,867,788 A | 2/1999 | Joensuu |
| 6,134,441 A | 10/2000 | Äström et al. |

(Continued)

OTHER PUBLICATIONS

Notification of Transmittal of the International Search Report and the Written Opinion of the International Searching Authority, or the Declaration in International Application No. PCT/US05/41911 (Aug. 28, 2006).

(Continued)

*Primary Examiner*—CongVan Tran
(74) *Attorney, Agent, or Firm*—Jenkins, Wilson, Taylor & Hunt, P.A.

(57) ABSTRACT

Methods and systems for processing messages at a first network node in a mobile communications network are disclosed. A first message relating to a communication in a mobile communications network that includes a called directory number is received. A lookup is performed in a first database based on the called directory number to determine whether a called party has been ported out of a first network and to determine a migration status of the called party. In response to determining that the called party has been ported out of the first network, a first reply message is formulated including first routing information from the first database that indicates a second network to which the called party has been ported. If the called party has not been ported out, a second reply message is formulated including second routing information from the first database that corresponds to the determined migration status.

45 Claims, 11 Drawing Sheets

U.S. PATENT DOCUMENTS

| | | |
|---|---|---|
| 6,138,007 A | 10/2000 | Bharatia |
| 6,208,870 B1 | 3/2001 | Lorello et al. |
| 6,298,232 B1 | 10/2001 | Marin et al. |
| 6,308,075 B1 | 10/2001 | Irten et al. |
| 6,320,943 B1 * | 11/2001 | Borland ................ 379/112.01 |
| 6,338,140 B1 | 1/2002 | Owens et al. |
| 6,356,529 B1 | 3/2002 | Zarom |
| 6,363,431 B1 | 3/2002 | Hammer et al. |
| 6,421,674 B1 | 7/2002 | Yoakum et al. |
| 6,453,174 B1 | 9/2002 | Cunningham et al. |
| 6,493,551 B1 | 12/2002 | Wang et al. |
| 6,519,242 B1 | 2/2003 | Emery et al. |
| 6,615,037 B1 | 9/2003 | Bharatia et al. |
| 6,662,017 B2 | 12/2003 | McCann et al. |
| 6,745,041 B2 | 6/2004 | Allison et al. |
| 6,771,950 B1 * | 8/2004 | Shupe et al. ............. 455/414.1 |
| 6,839,022 B1 | 1/2005 | Benco et al. |
| 6,975,862 B1 * | 12/2005 | Garland et al. ............. 455/433 |
| 7,031,438 B1 * | 4/2006 | Cheston et al. .......... 379/88.14 |
| 2004/0023655 A1 * | 2/2004 | Hoy et al. .................. 455/445 |
| 2004/0219935 A1 | 11/2004 | McCann et al. |
| 2004/0257273 A1 * | 12/2004 | Benco et al. ............. 342/357.1 |

OTHER PUBLICATIONS

Notification of Transmittal of the International Search Report or the Declaration in International Application No. PCT/US03/32626 (Apr. 1, 2004).

Bertrand, "Jambala Mobility Gateway-Convergence and Inter-System Roaming," Ericsson Review, p. 89-93, (1999).

"IP$^7$ Secure Gateway," Tekelec, P/N 909-0767-01, Revision B, pp. FN-1-FN-64 (Aug. 1999).

"Eagle Feature Guide," Tekelec, P/N 910-1225-01, Revision A, pp. i-iv and 1-143 (Mar. 1996).

* cited by examiner

PMM DATA DATABASE

| KEY(s) | DATA FIELDS | | | | | | |
|---|---|---|---|---|---|---|---|
| DN 504 | PC 506 | SSN 508 | RI 510 | ENTITY ADDRESS 512 | RN 514 | NP Status 516 | Mig Status 518 | Mode 520 | GSM Registered 522 |
| 9193803833 | 4-0-0 | 6 | RT-ON-SSN | 3023211234 (HLRA) | -- | Not Ported | Migrated | Dual | Registered |
| 2123675637 | 4-0-1 | 6 | RT-ON-SSN | 2023211234 (HLRB) | -- | Not Ported | Not Migrated | IS-41 | -- |
| 7704545731 | 4-0-0 | 6 | RT-ON-SSN | 3033211234 (HLRA) | -- | Ported In | Not Migrated | Dual | Not Registered |
| 9193803414 | 5-0-0 | -- | RT-ON-GT | -- | 9194326567 | Ported Out | Migrated | GSM | Registered |
| 9193803414 | -- | -- | RT-ON-GT | -- | 9194326433 | Ported Out | Not Migrated | IS-41 | -- |
| 9199672400 | -- | -- | -- | -- | -- | NKTBP | Not Migrated | IS-41 | -- |

GTT DATA DATABASE

| KEY RANGE | | DATA FIELDS | | | |
|---|---|---|---|---|---|
| MINIMUM DN 524 | MAXIMUM DN 526 | PC 528 | SSN 530 | RI 532 | TT 534 |
| 9193800000 | 9193809999 | 4-0-1 | 6 | RT-ON-SSN | 4 |
| 9194690000 | 9194699999 | 4-0-1 | 6 | RT-ON-SSN | 4 |
| 7704540000 | 7704549999 | 4-0-1 | 6 | RT-ON-SSN | 5 |
| 9105660000 | 9105669999 | 4-0-1 | 6 | RT-ON-SSN | 4 |

METHODS AND SYSTEMS FOR SIGNALING IN A COMMUNICATIONS NETWORK FOR PORTED, MIGRATED AND/OR DUAL-MODE SUBSCRIBERS

TECHNICAL FIELD

The subject matter disclosed relates to the routing of signaling messages in a communications network, and, more particularly, to methods and systems for processing and routing signaling messages associated with ported, migrated and/or dual-mode subscribers in a wireless communications network.

BACKGROUND

In mobile communications networks, a variety of different mobile signaling protocols are used to route calls, obtain subscriber information, and deliver SMS messages to mobile subscribers. For example, in North America, American National Standards Institute (ANSI)-41 or Interim Standard (IS)-41 is the dominant application layer mobile signaling protocol. In Europe, the Global System for Mobile communications (GSM) protocol is the dominant application layer mobile signaling protocol. GSM is also being increasingly used in North America. In addition, Session Initiation Protocol (SIP) is a widely used Internet Protocol (IP) telephony signaling protocol primarily used for voice over IP calls.

In some networks, a mobile telecommunications service provider that was initially an IS-41-only service provider may desire to add GSM service. Alternatively, a GSM-only service provider may desire to add IS-41 service. In order to add a new type of service, the service provider must add signaling nodes, such as mobile switching centers (MSCs), visitor location registers (VLRs), and home location registers (HLRs) of the new service type.

In a network that includes GSM and IS-41 network elements, some mechanism must exist for ensuring that signaling messages relating to calls directed to IS-41 subscribers are delivered to the appropriate IS-41 network elements and that signaling messages relating to calls intended for GSM subscribers are routed to the appropriate GSM network elements. This problem becomes quite complex in a network in which some subscribers are IS-41-only, others have multiple subscriptions, and still others are GSM-only. In a situation where a subscriber adds a new service or migrates to a different type of service, the subscriber may desire to keep the same directory number (DN). Because the same DN can be associated with different subscriptions, the processing and routing of mobile signaling messages in such an environment becomes even more complex.

Conventional solutions to routing messages for calls from a subscriber of one application layer mobile signaling protocol to a subscriber of a different application layer mobile signaling protocol include simply converting each message from one application layer mobile signaling protocol to another application layer mobile signaling protocol and vice-versa. Converting each message from one protocol to the other protocol and vice-versa greatly increases the time required to set up calls and increases the number of signaling messages in the network. In addition, conventional protocol converters are incapable of giving priority to one service type for dual-mode subscribers (e.g., subscribers that have both IS-41 and GSM subscriptions with the same service provider) and properly routing calls to dual-mode subscribers.

Similar issues arise when considering the porting of subscribers from one service provider to another while keeping the same DN, otherwise known as number portability (NP). Ported mobile subscribers may either be "ported in" to an operator's network from a competing carrier, or "ported out" of an operator's network to a competing carrier. One problem associated with processing messages associated with ported subscribers is locating the correct HLR containing the subscriber's subscription information. Various solutions exist in which MSCs, HLRs, and STPs cooperate to locate mobile subscription information so that calls and SMS messages can be routed to mobile subscribers. However, these solutions are directed solely to processing signaling messages associated with ported subscribers and do not provide an efficient mechanism for processing signaling messages associated with migrated subscribers or dual-mode subscribers.

In many respects, GSM and IS-41 based networks are quite similar, with the primary differences between the two technologies simply relating to the protocols used to communicate between the various network entities, and the operating frequencies of the communication handsets themselves.

A conventional call routing scenario is illustrated in FIG. 1. FIG. 1 shows a signaling transfer point (STP) 100, an IS-41 MSC 102 and an IS-41 HLR 104 that provide IS-41-based services, and a GSM MSC 106 and a GSM HLR 108 that provide GSM-based services. In FIG. 1, the GSM and IS-41 components may be under the control of the same service provider or may be operated by different service providers. As shown in FIG. 1, STP 100 communicates with each of IS-41 MSC 102, IS-41 HLR 104, GSM MSC 106 and GSM HLR 108 via signaling links over a network infrastructure. Similarly, IS-41 MSC 102 and GSM MSC 106 communicate via signaling links over a network infrastructure. That is to say, all of the entities shown are nodes communicating via signaling links over one or more networks.

MSCs are generally identified as network switching elements. Among their many functions, MSCs are responsible for determining which cell site will take possession of a call. Such hand off control is facilitated by a communication link between an MSC and an associated Base Station Controller (BSC)/Base Transceiver Station (BTS) pair (not shown). In contrast, an HLR is, briefly stated, a database that is used to store subscriber information for all customers within the home service area of the service provider. Functionally, an HLR is linked through a signaling network to other service areas such that subscriber information may be efficiently shared between geographically diverse networks, a characteristic that facilitates seamless inter-network roaming. Like an HLR node, a VLR node is also a database that contains subscriber information. A VLR, however, is specifically used to store information related to subscribers who are not in their home service area. More particularly, a VLR is where roaming related data for a customer is stored when the customer activates their handset outside of their designated home service area.

As generally illustrated in FIG. 1, STP 100 is coupled via signaling links to two HLR database nodes 104 and 108, and as such, all signaling message access to the HLR database nodes is controlled and administered by STP 100. Within a GSM wireless communication network, each mobile station handset is assigned a unique identification number known as an International Mobile Subscriber Identity (IMSI) identification number. In the case of European GSM-type network implementations, the IMSI code is typically associated with a particular telephone handset. In such networks, each user can also be assigned one or more Mobile Station Integrated Services Digital Network (MSISDN) numbers. In the wireless telecommunications industry, MSISDN numbers are analogous to the 10 digit telephone numbers in a conventional North American wired network. The fact that multiple MSISDN numbers can be associated with a single IMSI number indicates that more than one MSISDN number can be assigned and used to reach a single mobile station handset. It should be appreciated that the term "Directory Number" (DN) is used generically herein to refer to IMSI, MSISDN, Mobile Global Title, ANSI-41 Mobile Identification Numbers (MIN) and Mobile Directory Numbers (MDN), and other identification numbers associated with subscribers or handsets in a wireless communication network.

In any event, an MSISDN number is dialed whenever a user wants to communicate with a particular GSM mobile station. Referring to FIG. 1, STP 100, by analyzing a part of the dialed MSISDN number, determines the particular HLR that is storing routing information associated with the called mobile station. It should be appreciated that, depending on the nature of the call or signaling event, an STP may analyze and direct an HLR lookup based on either the IMSI or MSISDN number associated with the called or calling party, but the term DN is used herein to refer to each of them.

In the signaling example illustrated in FIG. 1, an ISDN user part (ISUP) initial address message (IAM) message is sent to IS-41 MSC 102 in an attempt to establish a call to a mobile subscriber. Those skilled in the art of mobile communication networks will appreciate that an ISUP IAM message is one of many signaling messages that are employed in a signaling system 7 (SS7) based signaling network to facilitate the setup of a telephone call. A detailed discussion of SS7 signaling message types and their associated function can be found in Signaling System #7 by Travis Russell, McGraw-Hill Publishing 1998.

In response to the IAM message, IS-41 MSC 102 launches a location request (LocReq) 1 to determine the location of the called mobile subscriber. Those skilled in the art of mobile communication networks will appreciate that a LocReq message is one of many signaling messages that are employed in an IS-41 based signaling network to facilitate the setup of a telephone call. The LocReq message queries an HLR for, registration, routing and location information about the mobile station. A detailed discussion of IS-41 signaling message types and their associated function can be found in *Mobile Telecommunication Networking With IS*-41 by Michael D. Gallagher et al., McGraw-Hill Publishing 1997. Additionally, a detailed discussion of GSM related signaling within a network can be found in *The GSM System for Mobile Communications* by Michel Mouly and Marie-Bernadette Pautet, Cell & Sys 1992.

Returning to the discussion of FIG. 1, it will be appreciated that LocReq message 1 is received by STP 100, which in turn analyzes the message. More particularly, STP 100 examines the DN associated with the called party, as well as service indication information contained in the message. STP 100 performs a lookup in an HLR routing table, determines that this message should be delivered to IS-41 HLR 104, and subsequently forwards the LocReq message 2 to IS-41 HLR 104. Upon receipt of LocReq message 2, IS-41 HLR 104 examines the message and, in one case, determines that the DN has been migrated to GSM services. This determination is made via a lookup in an internal routing database of IS-41 HLR 104. IS-41 HLR 104 formulates a location request return result message (LocReq RR) 3 that serves as a response to the original LocReq message 2. LocReq RR message 3 includes routing information for the MSC servicing the called party in the GSM system. That is, the LocReq RR message 3 identifies GSM MSC 106 as an intermediary for reaching the called party. STP 100 forwards LocReq RR message 4 to IS-41 MSC 102. IS-41 MSC 102 receives the LocReq RR message 4 and uses the routing information contained therein to modify the routing label of the original IAM message and forwards the original IAM message as modified 5 to GSM MSC 106. Alternatively, a new IAM message including the routing information can be forwarded.

The message 5 is received by GSM MSC 106, which formulates and sends a send routing information (SRI) request message 6 to STP 100. STP 100 analyzes the message to determine the DN value associated with the called party, as well as service indication information contained in the message. STP 100 performs a lookup in an internal HLR routing table, determines that this message should be delivered to GSM HLR 108, and subsequently formulates and sends an SRI request message 7. Upon receipt of SRI request message 7, GSM HLR 108 examines the message and formulates an SRI-Acknowledge (SRI-Ack) message 8 that serves as a response to the original SRI message 7. SRI-Ack message 8 includes routing information to locate the mobile station of the called party. SRI-Ack message 9 is forwarded to GSM MSC 106 and is used by GSM MSC 106 to forward the call to the called party within the GSM service portion of the network(s). That is, GSM MSC 106 modifies the routing label of the original IAM message to address the message to an MSC that is currently serving the called party and forwards 10 the modified message to the MSC.

As can be appreciated from the migration scenario above, the signaling can become quite complex. In the example shown in FIG. 1, ten messages are required to determine that the called party has migrated and to forward the calls to the appropriate MSC. A large number of messages are required to set up a call, which also increases the call setup time.

Similar issues arise when considering the porting of subscribers from one service provider to another while keeping the same DN. For example, assuming for the moment the called party has been ported out, when a signaling message associated with a mobile subscriber that has been ported out is received, processing of the signaling message by one of the operator's HLR nodes is no longer necessary. As discussed above, despite the fact that the service provider's HLRs no longer store information needed to locate the mobile subscriber, conventional signaling techniques provide for the continued routing of signaling messages associated with the mobile subscriber to at least one of the service provider's HLR nodes for processing, as shown in FIG. 1. In particular, when STP 100 receives a signaling message associated with the ported out subscriber, the signaling message is subsequently routed to an HLR despite the fact that the needed information for that mobile subscriber is no longer maintained in the HLR. Such unnecessary routing constitutes an inefficient use of both routing and HLR database resources.

In other described signaling schemes, some or all of the signaling to and from the HLRs is reduced. Still, migration and portability are treated independently in these schemes. For example, commonly-assigned U.S. Pat. No. 6,662,017, the disclosure of which is incorporated herein by reference in its entirety, describes methods and systems for routing messages relating to ported subscribers. Commonly-assigned U.S. patent application Ser. No. 10/405,859, the disclosure of which is incorporated herein by reference in its entirety, describes methods and systems for migrating between application layer mobile signaling protocols. With migration and portability being treated independently, signal routing will be more complex than is necessary when subscribers can be migrated, ported, dual-mode, or any combination thereof.

Therefore, what is needed is systems and methods of efficiently redirecting signaling messages associated with migrated, ported, and/or dual-mode mobile subscribers among signaling nodes.

SUMMARY

According to one aspect, a method for processing messages at a first network node in a mobile communications network is disclosed. A first message relating to a communication in a mobile communications network that includes a called directory number is received. A lookup is performed in a first database based on the called directory number to determine whether a called party has been ported out of a first network and to determine a migration status of the called party. In response to determining that the called party has been ported out of the first network, a first reply message including first routing information from the first database is formulated. The first routing information indicates a second network to which the called party has been ported. In response to determining that the called party has not been ported out, a second reply message including second routing information from the first database is formulated. The second routing information corresponds to the determined migration status.

According to another aspect, a method for processing messages in a mobile communications network at a first network node is disclosed. A first message relating to a communication in a mobile communications network is received. The first message includes a called directory number. Number portability and migration status information for the called directory number is determined. The first message is processed in a manner that gives priority to the number portability status information.

According to another aspect, a method for processing messages in a mobile communications network at a first network node is disclosed. A first message relating to a communication in a mobile communications network is received. The first message is formatted according to one of a first and a second application layer mobile signaling protocol, includes a called directory number, and requests routing information for a dual-mode handset. A lookup is performed in a first database based on the called directory number to determine whether a called party has been ported out of a first network. In response to determining that the called party has been ported out of the first network, a first reply message is formulated according to a same one of the first and the second application layer mobile signaling protocol and includes first routing information from the first database. The first routing information indicates a second network to which the called party has been ported.

According to another aspect, a routing node for processing messages in mobile communications network is disclosed. The routing node includes a communication module for receiving a first message relating to a call in a mobile communications network, the first message including a called directory number and a first database for storing entries corresponding to directory numbers. At least some of the entries include number portability and migration status information for the directory numbers. A database support module is operatively associated with the first database for performing a lookup in the first database based on the called directory number to determine whether a called party has been ported out of a first network and to determine a migration status of the called party. In response to determining that the called party has been ported out of the first network, the database support module formulates a first reply message including first routing information from the first database. The first routing information indicates a second network to which the called party has been ported. In response to determining that the called party has not been ported out, the database support module formulates a second reply message including second routing information from the first database, the second routing information corresponding to the determined migration status.

According to another aspect, a routing node for processing messages in a mobile communications network includes a communication module for receiving a first message relating to a call in a mobile communications network, the first message including a called directory number, and a first database containing entries corresponding to number portability and migration status information of directory numbers. A database support module is also included for processing the first message in a manner that gives priority to the number portability status information.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which:

FIGS. 5A and 5B are database structure diagrams which are intended primarily to illustrate the key or indexing structures of sample PMM and global title translation (GTT) database tables according to another aspect of the subject matter disclosed herein;

DETAILED DESCRIPTION OF THE INVENTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

Figure 2A:
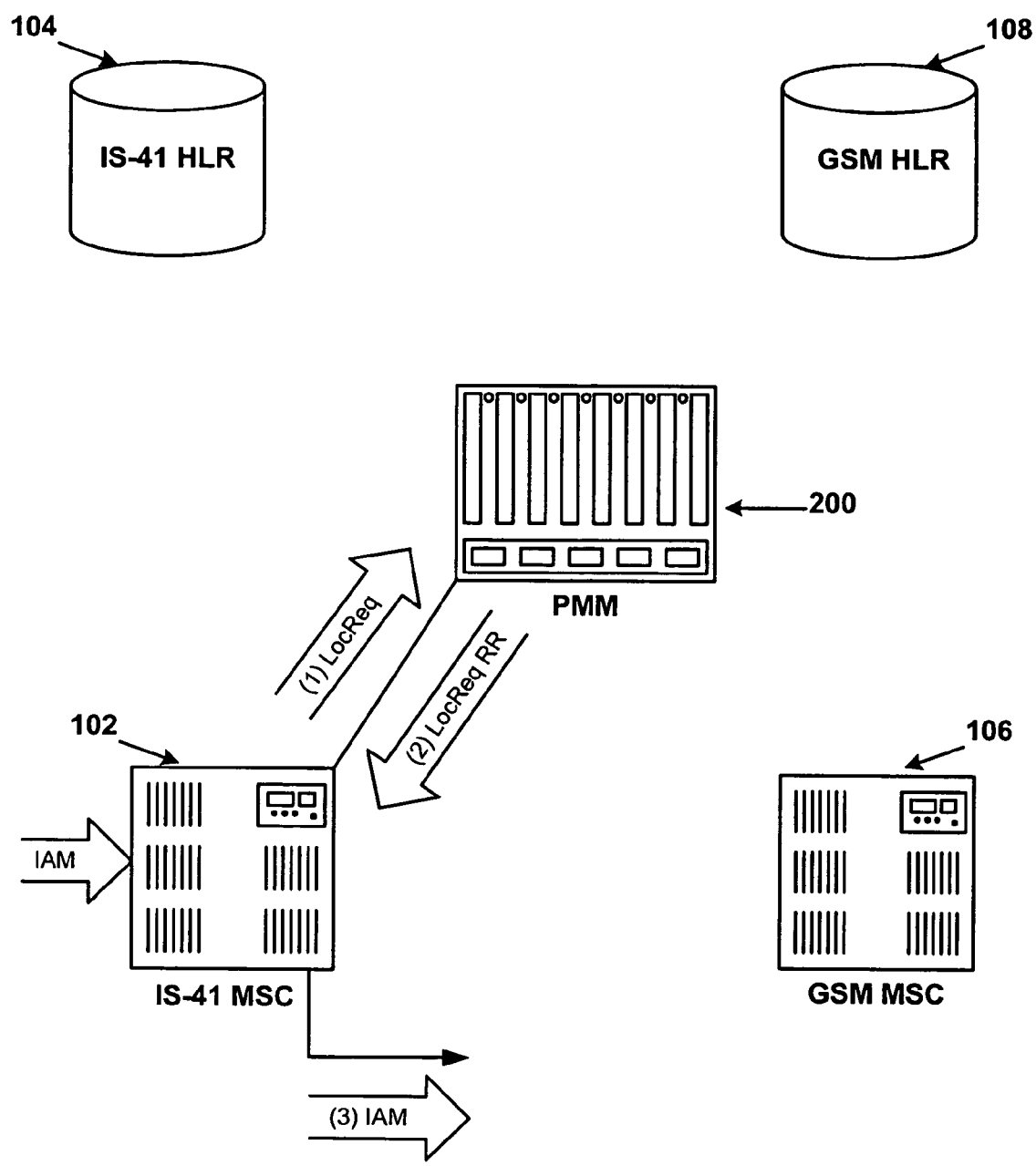
FIGS. 2A and 2B illustrate IS-41-originated signaling in a portability and migration management (PMM) system according to aspects of the subject matter disclosed herein.
Figure 2B:
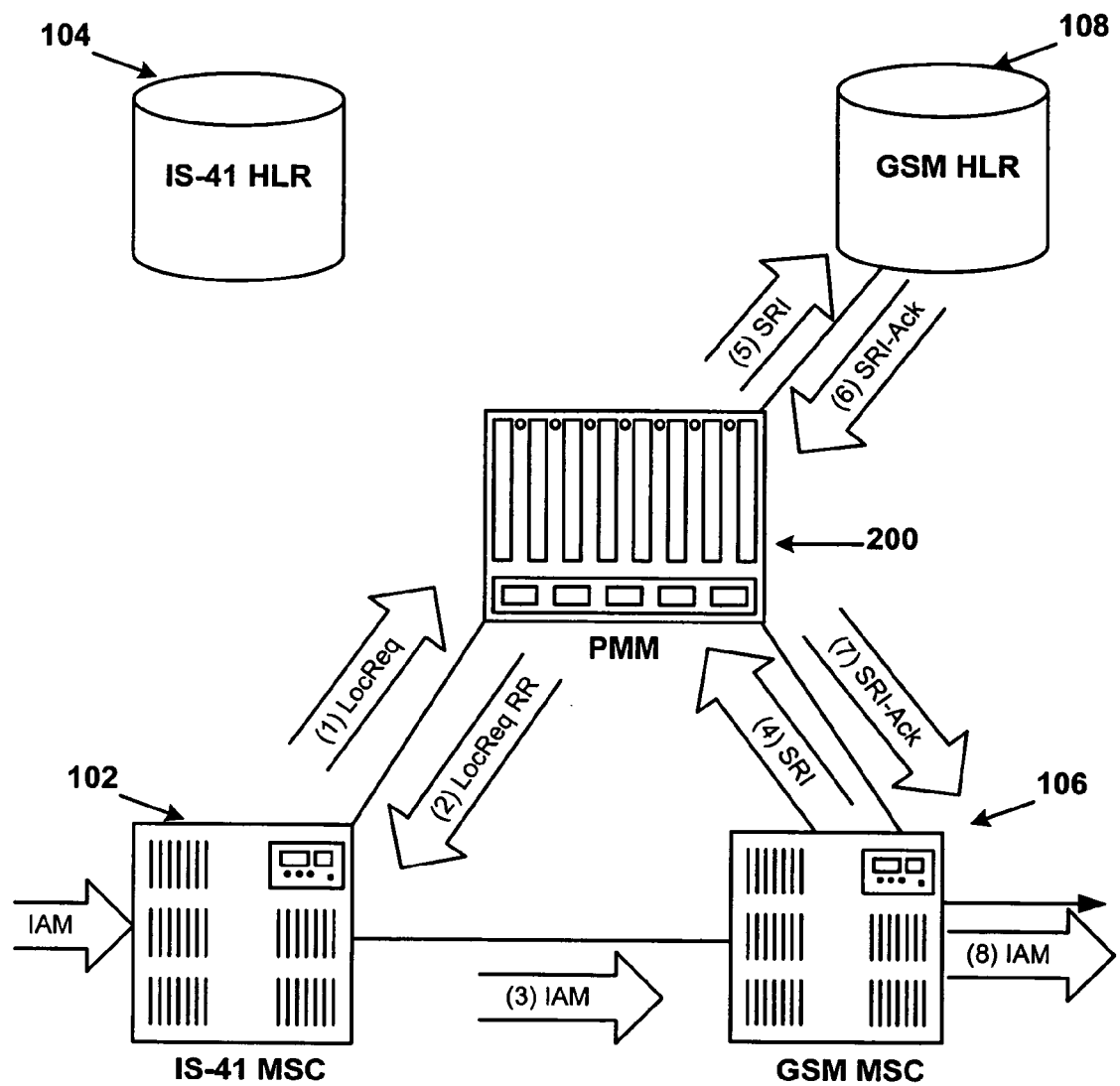

FIGS. 2A and 2B illustrate IS-41-originated signaling in a portability and migration management (PMM) system according to aspects of the subject matter disclosed herein. FIGS. 2A and 2B show a PMM signaling node 200, in addition to IS-41 MSC 102, IS-41 HLR 104, GSM MSC 106, and GSM HLR 108 described above. PMM 200 is a network element that performs functions similar to that of a telecommunications network packet routing switch, such as an STP or a signaling gateway (SG) routing node, and is additionally adapted to process migrated, ported, and dual-mode DNs in a manner that avoids unnecessary HLR access. In particular, PMM 200 can function as a packet routing node capable of routing call signaling messages between nodes of different protocols, such as SS7 nodes and IP nodes. For example, PMM 200 can employ an internal architecture similar to that of high performance STP and SG products which are marketed by the assignee of the present application as the Eagle® STP and IP$^7$ Secure Gateway™, respectively. A detailed description of the IP7 Secure Gateway™ may be found in Tekelec publication PN/909-0767-01, Rev B, August 1999, entitled Feature Notice IP7 Secure Gateway™ Release 1.0 published by Tekelec, which is incorporated herein by reference in its entirety. Similarly, a detailed description of the Eagle® STP may be found in the Eagle® Feature Guide PN/910-1225-01, Rev. B, January 1998, which is incorporated herein by reference in its entirety. Thus, PMM 200 may be an STP, an SS7-IP gateway, and STP with SS7/IP gateway functionality, or an SS7-IP gateway with STP functionality.

Figure 1:
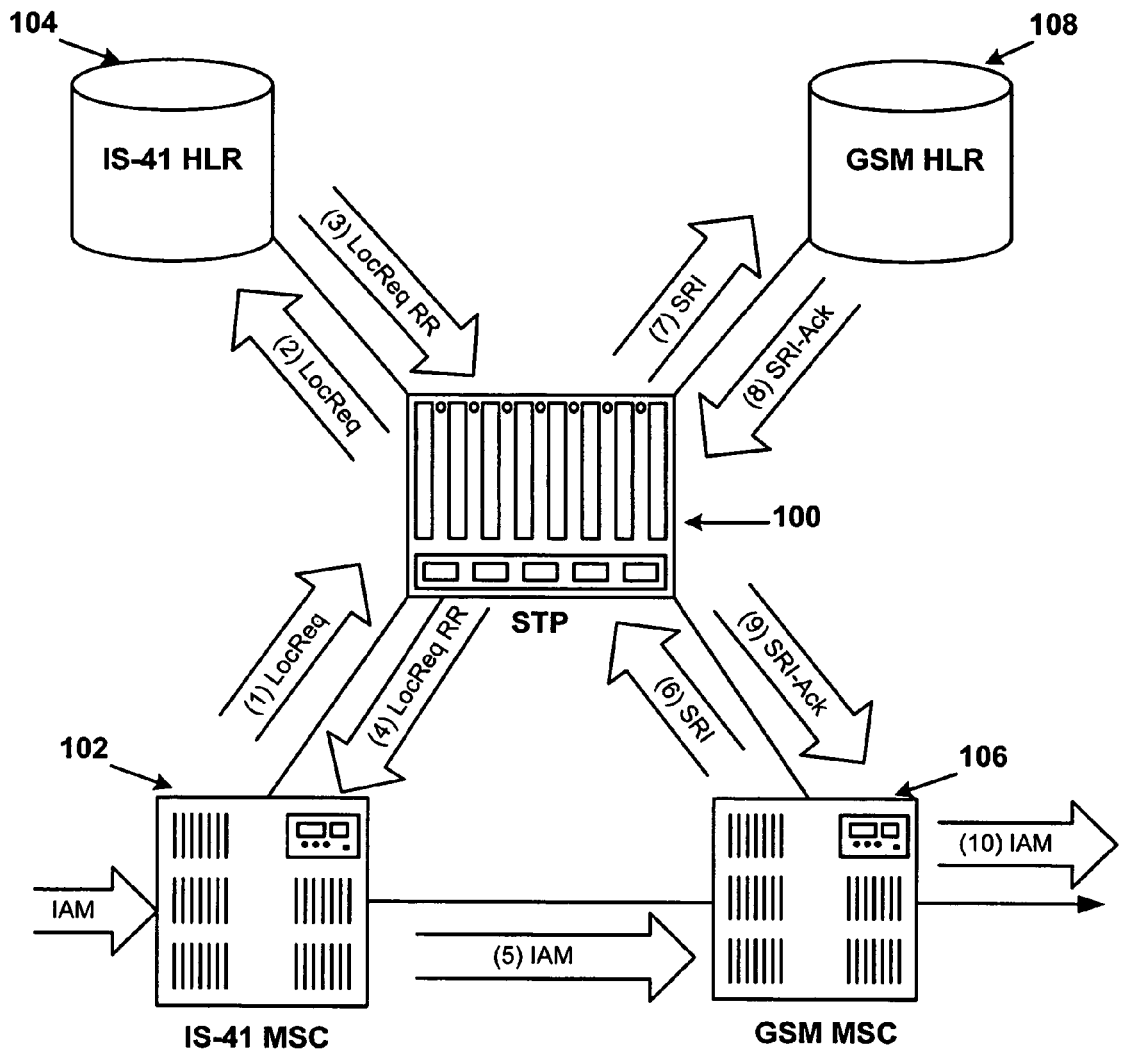
FIG. 1 is a conventional call routing scenario.

In FIG. 2A, IS-41 MSC 102 receives and processes a call-related message, such as an IAM message, in an attempt to establish a call to a mobile subscriber. IS-41 MSC 102 then launches a LocReq message 1 in an attempt to locate the mobile subscriber. LocReq message 1 is received by PMM 200, which examines the DN associated with the called party, as well as service indication information contained in the message. PMM 200 performs a lookup in an internal database (described further below) regarding the particular DN and, for example, determines that the DN has been migrated to GSM services and is ported out. PMM 200 then formulates a LocReq RR 2 that serves as a response to the original LocReq message 1. LocReq RR message 3 includes a routing number (RN) as a prefix to the called party DN in the MSC-ID field to indicate to IS-41 MSC 102 the location of the MSC to which the subscriber has been ported. IS-41 MSC 102 modifies the routing label of the original IAM message to address it to a gateway MSC (not shown) in the network now servicing the called party and forwards the call-related message to the gateway MSC. Here, it is important to note that the fact that the mobile subscriber was ported out of the network takes priority over the fact that the mobile subscriber was migrated to GSM. This priority is established to avoid wasting time and resources to perform any additional processing inside the network once it is determined that the mobile subscriber is ported out to another network. In contrast to the ten steps required in FIG. 1, the same result is obtained with as few as three steps.

FIG. 2B illustrates IS-41-originated signaling in a PMM system according to another aspect of the subject matter disclosed where the mobile subscriber is not ported out but has migrated to GSM. In FIG. 2B, IS-41 MSC 102 receives and processes a call-related message, such as an IAM message in an attempt to establish a call to a mobile subscriber. IS-41 MSC 102 then launches a LocReq message 1 in an attempt to locate the called mobile subscriber. LocReq message 1 is received by PMM 200, which examines the DN associated with the called party, as well as service indication information contained in the message. PMM 200 performs a lookup in an internal database (as described further below) regarding the particular DN and determines that the DN has been migrated to GSM services, but is not ported out. PMM 200 then formulates a LocReq RR 2 that serves as a response to the original LocReq message 1. LocReq RR message 3 includes routing information as a prefix to the called party DN in the MSC-ID field to notify IS-41 MSC 102 of the location of the migrated-to MSC. IS-41 MSC 102 forwards the original IAM message as modified 3 to GSM MSC 106, which is the MSC that is serving the called party. Alternatively, a new IAM in message can be sent to GSM MSC 106.

IAM message 3 is received by GSM MSC 106, which formulates and sends a send routing information (SRI) request message 4 to PMM 200. PMM 200 analyzes the message to determine the DN value associated with the called party, as well as service indication information contained in the message. PMM 200 performs a lookup in an internal HLR routing table, determines that this message should be delivered to GSM HLR 108, and subsequently formulates and sends an SRI request message 5. Upon receipt of SRI request message 5, GSM HLR 108 examines the message and formulates an SRI-Ack message 6 that serves as a response to the original SRI message 5. SRI-Ack message 6 includes routing information to locate the mobile station of the called party. SRI-Ack message 7 is forwarded to GSM MSC 106 and is used by GSM MSC 106 to forward the call to the called party within the GSM service portion of the network(s). That is, GSM MSC 106 modifies the routing label of the original IAM message to address it to a gateway MSC (not shown) in the network now servicing the called party and forwards IAM message 8 call- routing is performed with as few as to the gateway MSC (not shown). As can be appreciated, in the call signaling scenario of FIG. 2B, two signaling/processing steps relating to IS-41 HLR 104 are saved (see steps 2 and 3 of FIG. 1). Thus, in contrast to the ten steps required in FIG. 1, call routing is performed with as few as eight steps.

Figure 3:
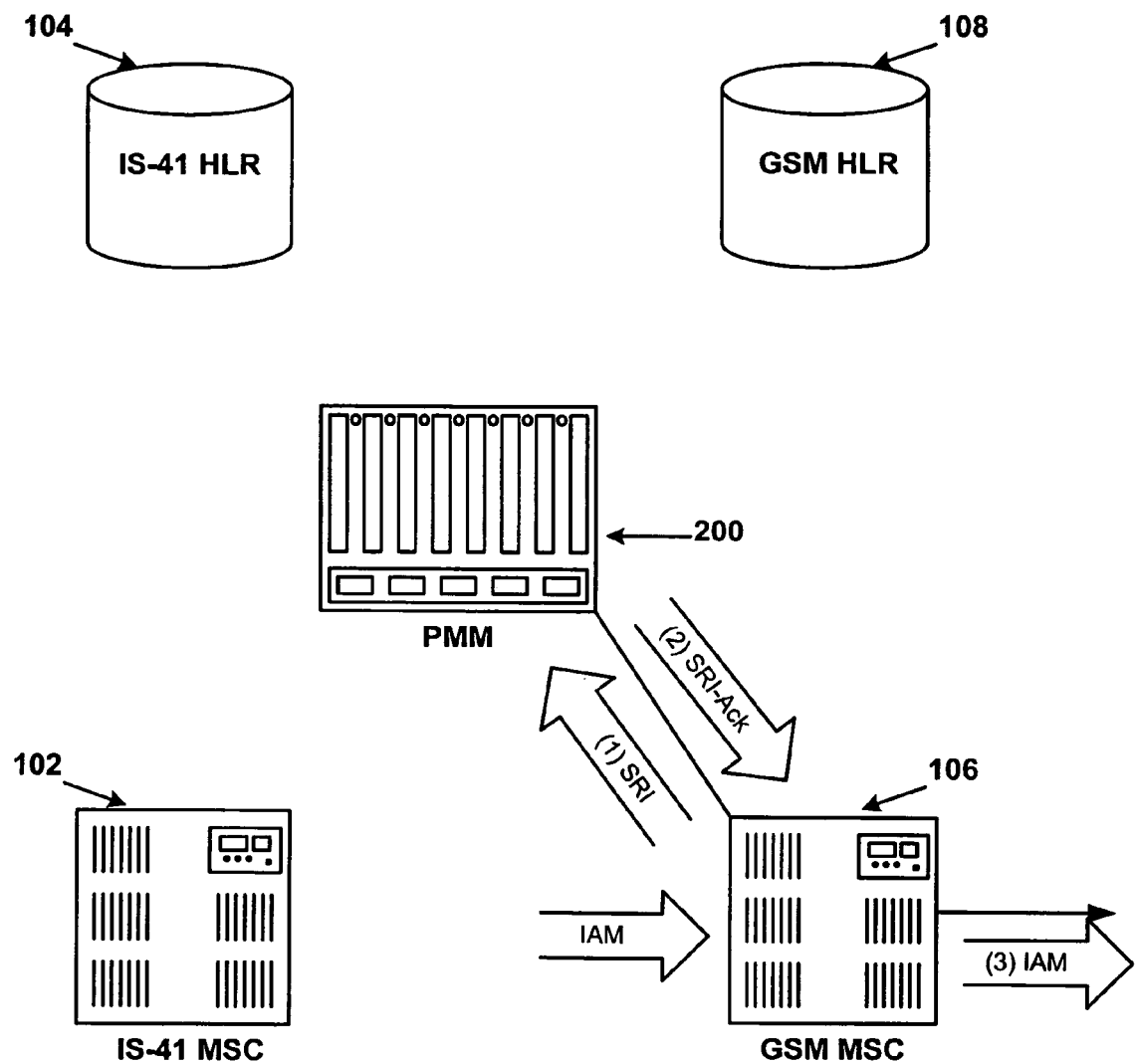
FIG. 3 illustrates GSM-originated signaling in a PMM system according to another aspect of the subject matter disclosed herein.

The FIG. 3 illustrates GSM-originated signaling in a PMM system according to another aspect of the subject matter disclosed herein. FIG. 3 once again shows PMM signaling node 200, IS-41 MSC 102, IS-41 HLR 104, GSM MSC 106, and GSM HLR 108. PMM 200 is adapted to process signaling messages relating to calls or SMS messages for ported, migrated, or dual-mode subscribers.

In FIG. 3, GSM MSC 106 receives and processes an IAM message in an attempt to establish a call to a mobile subscriber. GSM MSC 106 then launches an SRI message 1 in an attempt to locate the called subscriber. SRI message 1 is received by PMM 200, which examines the DN associated with the called party, as well as service indication information contained in the message. PMM 200 performs a lookup in an internal database (described further below) regarding the particular DN and, for example, determines that the DN has been ported out. PMM 200 then formulates an SRI-Ack message 2 that serves as a response to the original SRI message 1. SRI-Ack message 3 includes an RN as a prefix to the DN in the MSC-ID field to notify GSM MSC 106 as to how to route the call. GSM MSC 106 forwards the IAM message to a gateway MSC in the network now servicing the called party. Like in the example illustrated in FIG. 2A, as few as three steps may be required.

Although the above description refers to the receipt and processing of IAM messages by IS-41 MSC 102 and/or GSM MSC 106, it will be appreciated that many types of signaling messages are defined and may be employed within GSM and IS-41 wireless communication networks, and that PMM node 200 may be adapted to accommodate messages resulting from the receipt and processing by IS-41 MSC 102 and/or GSM MSC 106 of any number of signaling message types. For example, instead of an IAM message, IS-41 MSC 102 and/or GSM MSC 106 may receive and process a session initiation protocol (SIP) INVITE message. SIP is an IP telephony signaling protocol developed by the SIP Working Group of the Internet Engineering Task Force (IETF). Primarily used for voice over IP calls, SIP is an application-layer control signaling protocol for creating, modifying and terminating sessions with one or more participants. These sessions include Internet multimedia conferences, Internet telephone calls, and multimedia distribution, for example. More information regarding SIP can be obtained via the IETF organization web site.

Figure 4:
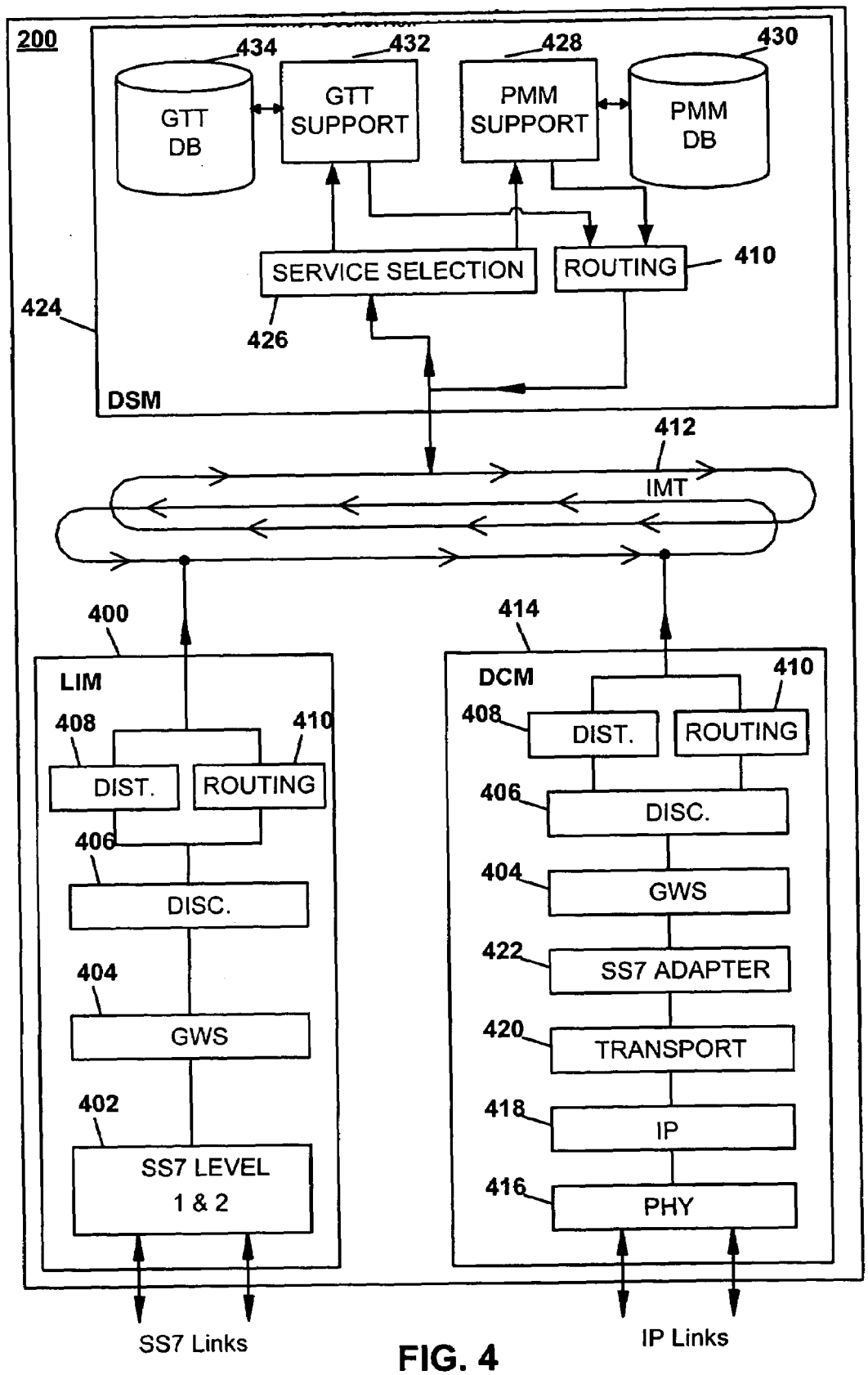
FIG. 4 is a block diagram illustrating an exemplary internal architecture for a PMM signaling node according to an aspect of the subject matter disclosed herein.

FIG. 4 is a block diagram illustrating an exemplary internal architecture for a PMM signaling node according to an aspect of the subject matter described herein. Referring to FIG. 4, PMM 200 includes a plurality of internal processing modules connected to each other via an internal network or bus. Each of the internal processing modules may include a printed circuit board with an application processor for performing application layer functions and a communications processor for communicating with other modules via the internal bus. One type of processing module that may be included within PMM 200 is a link interface module (LIM) 400. LIM 400 may send and receive messages via SS7 signaling links and may forward messages to other modules within PMM 200 for further processing or routing.

In the illustrated example, LIM 400 includes an SS7 level 1 and 2 module 402 for performing SS7 level 1 and 2 functions, such as error correction, error detection, and sequencing of SS7 messages. Gateway screening module 404 screens messages to determine whether to allow the messages into the network. Discrimination module 406 determines whether a received SS7 message should be distributed to an internal processing module within PMM 200 for further processing or whether the message should be routed over an external signaling link. Distribution module 408 distributes messages identified by discrimination module 406 as requiring further processing. Routing module 410 routes messages identified by discrimination module 406 as requiring routing.

In the illustrated example, PMM 200 also includes a data communications module (DCM) 414 for sending and receiving SS7 messages via IP signaling links. DCM 414 may include gateway screening 404, message discrimination 406, message distribution 408, and message routing modules 410 similar to those described with respect to link interface module 400. In addition, DCM 414 may include a physical layer 416 for performing physical layer functions for sending and receiving messages over IP signaling links. In one exemplary embodiment, physical layer 416 may be implemented using an Ethernet interface. IP layer 418 performs network layer functions for sending and receiving messages via IP signaling links, such as IP forwarding based on destination IP addresses. Transport layer 420 performs functions for providing reliable transfer of SS7 messages over IP signaling links. For example, transport layer 420 may be implemented using the transmission control protocol (TCP) or the stream control transmission protocol (SCTP). SS7 adaptation layer 422 performs functions for adapting SS7 messages for transport over an IP network. SS7 adaptation layer 422 may be implemented using Tekelec's transport adapter layer interface (TALI), MTP level two user adaptation layer (M2UA), MTP level three user adaptation layer (M3UA), SCCP signaling adaptation layer (SUA), and/or MTP level two peer to peer user adaptation layer (M2PA), as described in the correspondingly named IETF Internet drafts and RFCs.

According to one aspect, PMM 200 includes a database services module (DSM) 424 for tracking registration and portability status of subscribers and for routing and processing location query messages and other messages using the registration and portability status. As used herein, the term "registration status" refers to an indication of the network type (e.g., IS-41 or GSM) with which a subscriber is currently registered. "Portability status" refers to an indication of whether or not a particular DN is ported. In the illustrated example, database services module 424 includes a service selection module 426 for selecting the appropriate service for a received message as between PMM service or global title translation (GTT) service, PMM support module 428 for processing location query messages and tracking subscriber registration information, a PMM database 430, a GTT support module 432, a GTT database 434 and a routing function 410.

PMM support module 428 preferably tracks the subscriber registration status in an application layer mobile signaling protocol. For example, PMM support module 428 may track the GSM registration status of a subscriber of both IS-41 and GSM service (dual mode subscribers). In an alternate embodiment, PMM support module 428 may track IS-41 registration status of such a subscriber.

While in the embodiment illustrated in FIG. 4 PMM support module 428 and database 430 are located on a database services module, the present invention is not limited to such an embodiment. In an alternate embodiment, PMM support module 428 and/or database 430 may be located on a communication link module, such as LIM 400 or DCM 414. In yet another alternate embodiment, PMM support module 428 may be located on a separate computing platform from PMM 200. In such an embodiment, the separate computing platform may be connected to PMM 200 via a local area network.

In general, DSM 424 provides the control and database processes necessary to perform the required network address translations to achieve the porting control routing functionality. Service selection module 426 on DSM 424 directs incoming SS7 message packets to either a PMM database process or a GTT database process. Routing module 410 on DSM 424 routes messages based on routing information in messages returned by PMM support module 428 or GTT support module 432, respectively.

In some instances, such as for calls directed to ported-out subscribers, PMM 200 may respond on behalf of the out-ported HLR and provide an RN corresponding to the network to which the DN has been ported. This ability to create a response on behalf of the HLR for ported-out subscribers, independently of the migration status, decreases the signaling messages required to route calls or SMS messages to ported-out subscribers.

FIGS. 5A and 5B are database structure diagrams which are intended primarily to illustrate the key or indexing structures of sample PMM and GTT databases 430 and 434, respectively. It is understood that the actual PMM and GTT databases may include multiple tables and other data structures. Database 430 and 434 are intended to illustrate exemplary database fields used in formulating mobile query response messages.

PMM database 430 is comprised of several data fields including a DN (e.g., IMSI, MSISDN, etc.) key field 504, a point code (PC) field 506, a subsystem number (SSN) field 508, a routing indicator (RI) field 510, an entity address field 512, a routing number (RN) field 514, a number portability (NP) status field 516, a migration status field 518, a handset mode field 520, and a GSM registration status field 522.

With particular regard to DN key field 504, it should be noted that in an alternate embodiment, the DN key filed could include a continuous range or block of DN values. As such, a range or block of DN values may be designated as "exceptions" to the default routing rules defined in the associated GTT database 434. For example, the DNs stored in DN field 504 may be within ranges of DNs in GTT table 434 and thus represent exceptions to those ranges. In addition, the DNs stored in DN field 504 may be outside of any of the DN ranges in GTT table 434. As described above, PMM 200 is adapted to respond differently to different types of messages in certain cases. For instance, in the case of an SRI signaling message associated with a call to a ported-out subscriber, the PMM node may generate and route a new SRI-Ack message instead of simply routing or re-directing the original SRI message. That is, PMM 200 is adapted to not only route/re-direct signaling messages, but to create new signaling messages based on information stored in PMM database 430.

The sample default routing rule GTT database 434 is comprised of several fields including minimum and maximum MIN key fields 524 and 526, respectively, a point code (PC) field 528, a subsystem number (SSN) field 530, a routing indicator (RI) field 532, and a translation type (TT) field 534.

It should be appreciated that the PMM and GTT database record structures and pseudo data presented in FIGS. 5A and 5B, while supportive of the examples presented in this disclosure, are merely illustrative of some or all of the basic information used to perform the required routing data lookups. In practice, the actual database record structures and overall database design may vary according to particular implementation and system performance requirements.

Referring to FIG. 5B in particular, the GTT or range-based default database 434 includes key fields in the left hand column and data fields in the right hand column. The key fields represent ranges of DN numbers associated with a particular node. For example, the first key field specifies a minimum DN value of (919) 380-0000 and a maximum DN value of (919) 380-9999. The routing data fields corresponding to this DN range include a PC value of 4-0-1, an SSN value of 6, an RI value of route on subsystem number (RT-ON-SSN), and a TT value of 4. The data included in the data fields are merely illustrative of data fields that can be included in the range-based, default GTT database 434. Similar key fields and data fields are shown for other sample DN value ranges.

Referring again to FIG. 5A, PMM database 430 contains entries that are exceptions to the entries in the range-based default routing database, i.e., GTT database 434. In FIG. 5A, the left-hand column includes a key DN value, and the right-hand column includes data fields for each DN entry. Again, it should be noted that in an alternate embodiment, the key DN value could include a continuous range or block of "exception" DN values. In the particular example shown in FIG. 5A, the first entry includes a key field DN value of (919) 380-3833. The data fields corresponding to the first entry include a PC of 4-0-0, an SSN value of 6, an RI value of RT-ON-SSN, an Entity Address 303211234 representing the mobile service entity, HLR A, a number portability status value of "Not Ported", a migration status value of "Migrated", a handset mode identifier of "Dual", and GSM registration status value of Registered. Again, these data fields are merely illustrative of the data fields that can be included in PMM database 430.

The dual database architecture employed in PMM 200 provides a number of benefits to the network operator. For example, the complementary nature of the two databases optimally minimizes routing database memory resource requirements. Furthermore, the task of maintaining and administering HLR address translation information is greatly simplified, in that only exceptions to the conventional block-based routing rules must be explicitly entered into PMM database 430. If such were not the case and, for example, a particular network operator had data associated with 500,000 mobile subscribers stored in one or more HLRs, the network operator would be required to create and store at least one unique routing record for each of the 500,000 subscribers. The exceptions-based structure of PMM and GTT databases 430 and 434 simply requires, in such a case, that the operator create and store individual routing records in PMM database 430 only for those DN numbers that do not adhere to the range or block-based rules that have been specified by GTT database 434. For example, if a number is ported from one HLR to another HLR, the DN number may be an exception to the block based rules in the second HLR. In the special case where all of the operator's DN numbers adhere to the block-based rules specified in GTT database 434, PMM database 430 would be empty. At the other extreme, where all of the operator's DN numbers do not adhere to the general block-based rules specified in GTT database 434, PMM database 430 would contain at least one entry for each of the operator's assigned DN numbers.

With reference again to FIG. 4, various parameters may be used by service selection module 426 to determine the type of service (e.g., PMM service or GTT service) that is required by an incoming signaling message. These parameters include a routing indicator (RI), a domain indicator (DI), global title indicator (GTI) parameter, a translation type (TT) parameter, a numbering plan (NP) parameter, and a nature of address indicator (NAI) parameter. For example, in one embodiment, PMM 200 may be configured such that a received SS7 signaling message with a GTI value of 4, a TT value of 10, an NP value of 1, and an NAI value of 3 obtains PMM processing. These parameters, their meanings within the context of an SS7 communication network, and their ranges of values are well known to those skilled in the art and consequently will not be discussed in detail. It should suffice to say that PMM 200 may rely on some or all of these parameters to determine the need for PMM translation service. With particular regard to the domain indicator (DI), it will be appreciated that this value indicates whether the message is in an ANSI or an ITU format, and may further indicate the national or international character of the message. Such information may be obtained by both explicit and implicit means from a received signaling message.

Once the need for PMM processing has been determined, the specific type of service or mobile service entity type is next determined. With particular regard to PMM services, the types of services available could include GSM services, such as HLR, EIR, AuC, SMSC, etc. Determination of the specific PMM service is made through examination of a subsystem number (SSN) parameter that is contained in the SCCP called party address (CdPA) field of the signaling message. Once again, the SSN parameter is well known to those skilled in the art and consequently will not be discussed in detail herein. It should suffice to say that PMM node 200 is configured to recognize certain SSN values as indicating the need for a particular type of PMM service.

From an operational standpoint, signaling messages determined to require PMM processing are forwarded to PMM support module 428. For these messages, a lookup is performed in PMM database 430 based on DN number associated with the incoming signaling message packet. Assuming that a match is found in PMM database 430, it will again be appreciated that subsequent PMM processing will be determined by the type of the original received message. With regard to SS7 transaction capabilities application part (TCAP) based signaling messages, message type may be determined through examination of a TCAP operation (OP) code value contained within the message. It will be appreciated that many types of signaling messages are defined and currently employed within GSM and IS-41 wireless communication networks, and that PMM node 200 may be adapted to accommodate any number of signaling message types.

In any event, if during a lookup operation, a DN match is located in PMM database 430, the appropriate routing data is returned by PMM database 430. No secondary search of GTT database 434 is required in such a case. However, in the event that no DN match is located in PMM database 430, a secondary search is performed in default range-based GTT database 434.

Figure 6A:
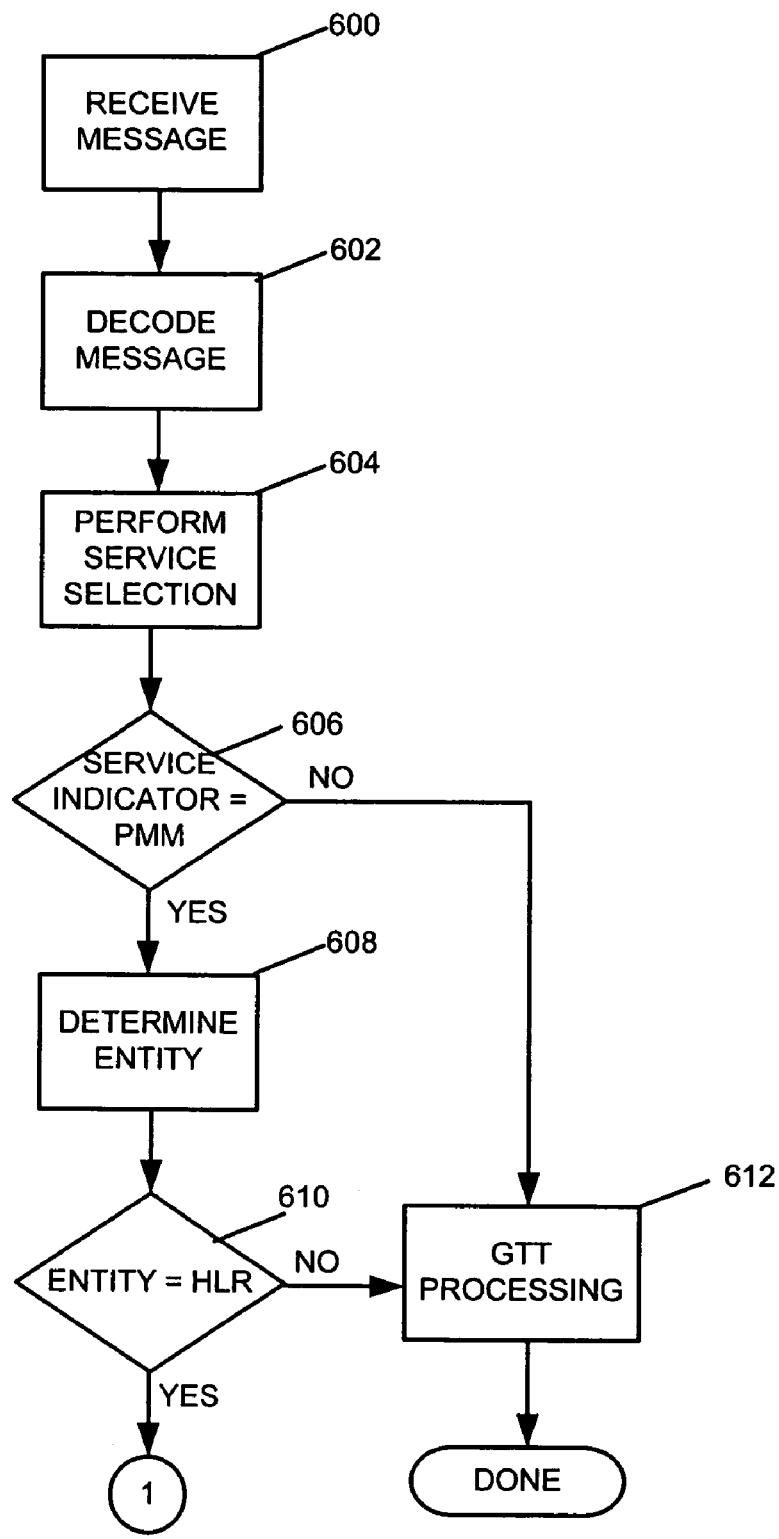
FIGS. 6A–6C present a flow chart illustrating the associated message processing steps performed the PMM according to another aspect of the subject matter disclosed herein.
Figure 6B:
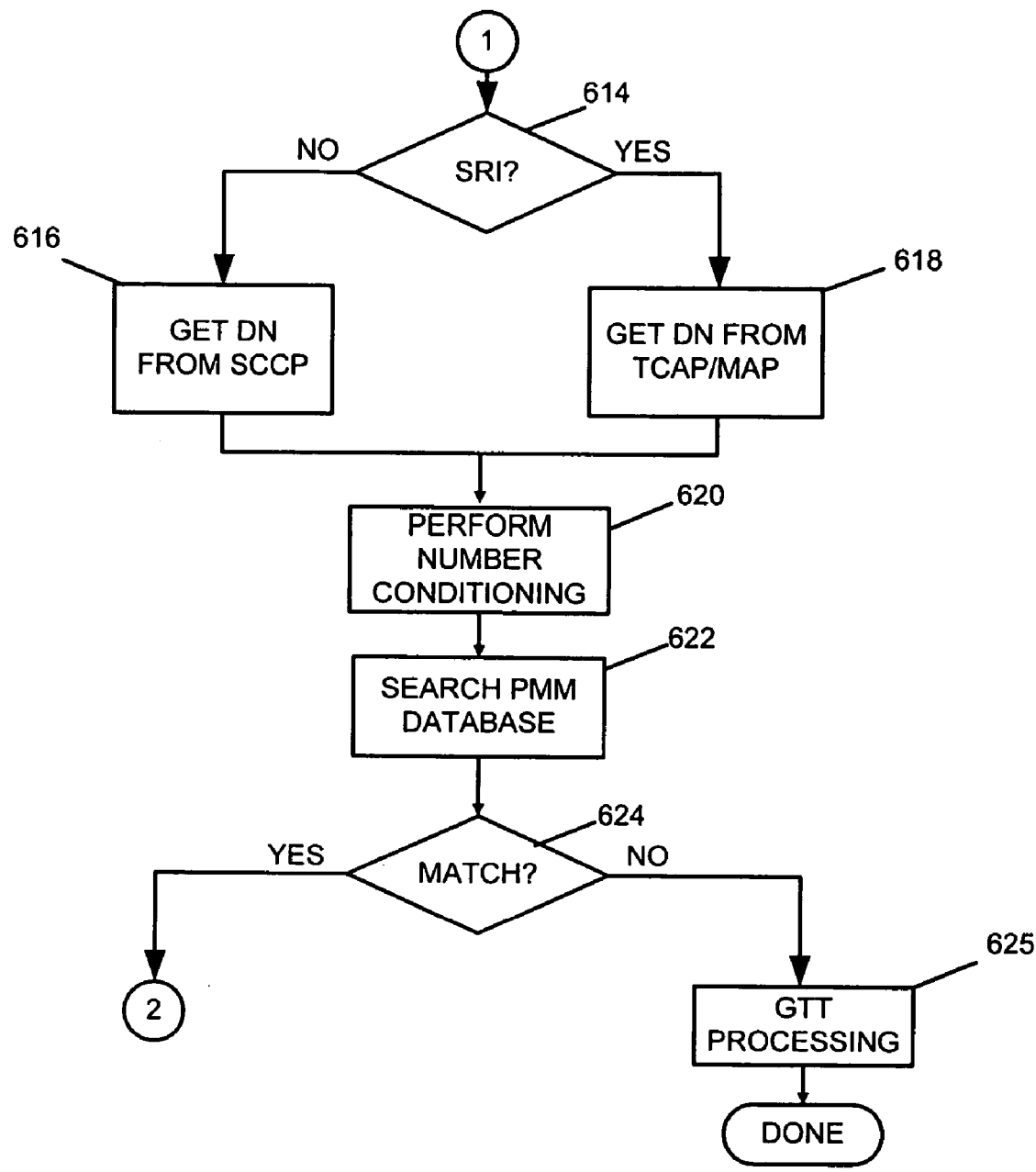
Figure 6C:
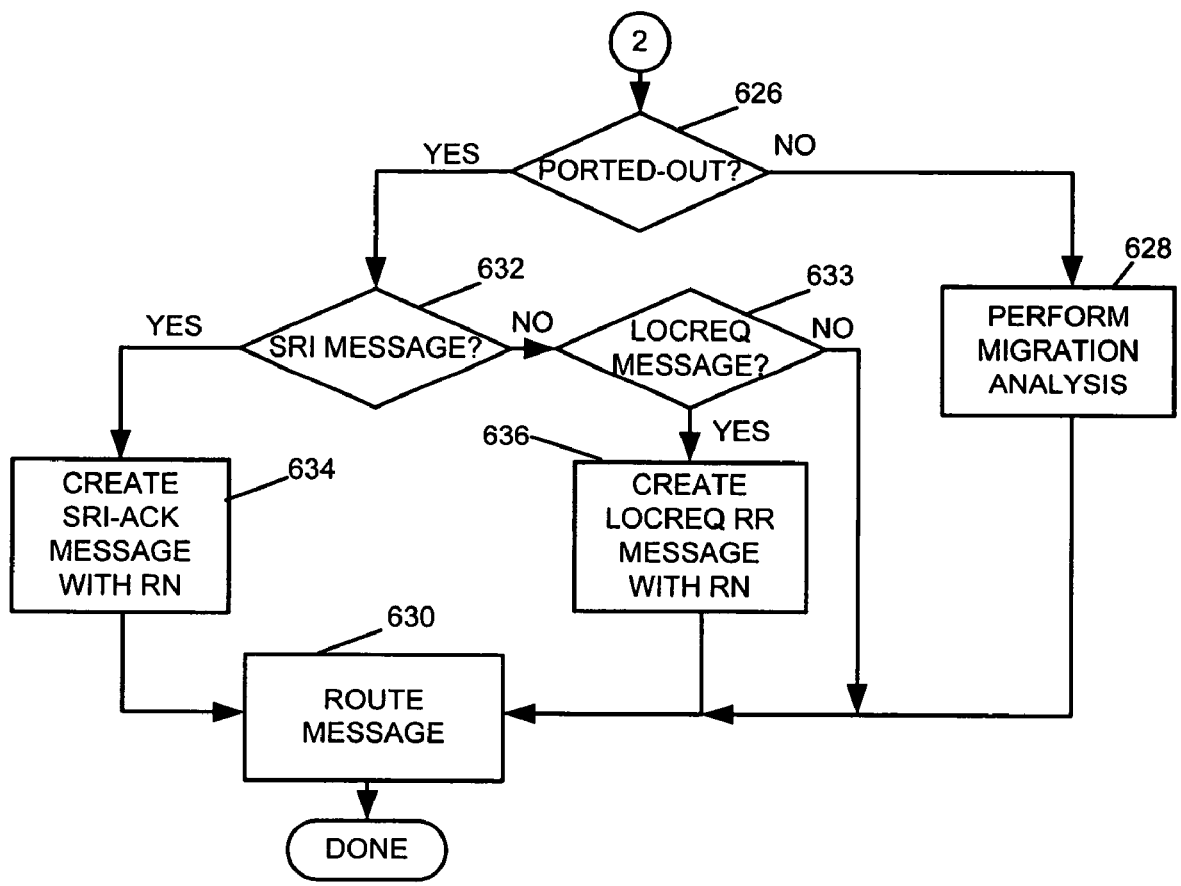

FIGS. 6A–6C present a flow chart illustrating the associated message processing steps performed at DSM 424 of PMM 200. Referring to FIGS. 6A–6C in conjunction with FIG. 4, in step 600, the signaling message arrives at DSM 424 and service selection module 426 receives the packet. In step 602, service selection module 426 decodes and examines packet content information contained within the signaling message header in order to establish which type of service is required. For example, the RI parameter contained within the signaling message packet is analyzed to determine whether PMM processing is indicated.

Assuming the RI value in the received signaling message indicates that PMM processing is required, the GTI, TT, NP, and NAI parameters contained within the signaling message packet are analyzed in step 604 to determine in step 606 whether PMM or GTT service is required. For example, if the received signaling message includes an RI value of "RT-ON-GT", a GTI value of 4, a Translation Type (TT) value of 10, a "national" NAI value of 3, and an "E.164" NP value of 1, these values can be collectively interpreted as indicating the need for PMM service. It is thus determined in step 606 that PMM service is needed. The signaling message content is then further analyzed in step 608 to determine the mobile service entity type or type of PMM translation service required. For example, the CdPA SSN parameter may be examined to determine whether GTT support 432 processing or PMM support 428 processing should be used. In example, if based on the SSN the entity type is determined to be anything other than an HLR, then GTT support 432 processing should be used without the need to access PMM database 430, since the message type would be outside the scope of PMM database 430, as indicated in steps 610 and 612. If however, the entity is determined to be an HLR in step 610, then a determination is made in processing step 614 with regard to how the DN value should be extracted from the signaling message. In the particular embodiment shown in FIG. 6B, it is assumed that a signaling message packet is either an SRI message or a non-SRI message. As such, if a signaling message is identified as a non-SRI message (step 614), the DN value is extracted (step 616) from the SCCP CdPA field of the message. The DN is typically stored within the CdPA field in a structure commonly referred to as the global title digits (GTD) sub-field as an MSISDN. If the signaling message is identified as an SRI message (step 614), the DN value is extracted (step 618) from the TCAP/MAP MSISDN digits field of the message.

In any event, the DN number encoded within the packet is subsequently examined and conditioned, as necessary (step 620). Number conditioning may be employed as needed to ensure that the DN is compatible with the format of the key field data stored in PMM and GTT databases 430 and 434. For example, number conditioning operations may include deleting extra prefix digits or pre-pending extra digits to a DN contained within a signaling message packet so as to force the number to conform to an international format. Conversion of a mobile identification number from one numbering standard to another may also be performed. For instance, the MSISDN associated with an incoming signaling message packet may be converted from a first industry standard format known as E.214 to a second industry standard format known as E.212 prior to database lookup operations. Once again, it should be appreciated that such DN conditioning services are necessary only in the case that the format of the incoming message DN is not consistent with the corresponding key field data format in PMM and GTT databases 430 and 434.

In step 622, PMM database 430 is searched using the DN as at least a portion of the search key. In one embodiment, PMM database 430 may utilize a table structure similar to that shown in FIG. 5A. However, it will be appreciated that in alternative embodiments, an entity type key field may also be used or PMM database 430 may include multiple data tables, where each table contains data associated with a particular entity type (e.g., HLR, EIR, AuC, SMSC, etc.).

With regard to the PMM database search, if no match is found in PMM database 430 in step 624, then GTT support 432 processing is performed on the message in step 625. If, on the other hand, a match is found in PMM database 430 in step 624, (i.e., there is an entry in PMM database 430 corresponding to the message's DN value), then processing of the original received signaling message thereafter depends both on the type of the original received message, whether the DN is ported and whether the DN is migrated. More particularly, referring to FIG. 6C, if the DN value associated with the original received message is determined in step 626 to have not been ported out of the network being serviced by PMM node 200, (i.e., not ported, not known to be ported, or ported in), then migration analysis is performed on the DN, as indicated by step 628, and the resulting message is transmitted from PMM node 200 (step 630). Migration analysis is described below with reference to the flow chart of FIG. 8. It will be appreciated that the routing information returned by PMM database 430 may include the network address of an intermediate network node, (e.g., signal transfer point, signaling gateway, packet router, etc.), or final destination node (HLR, EIR, AuC, SMSC, etc.).

If, however, the DN associated with the original received message is determined to have been ported out of the network being serviced by PMM node 200 in step 626, then the next processing step is dependent on the type of the original received message. It should be appreciated from FIG. 6C then that migration analysis is preferably performed only when the DN is not ported out. That is, when the DN is ported out, the migration analysis is bypassed. Accordingly, number portability concerns take priority over migration concerns, as can be appreciated also from FIGS. 2A and 2B and their accompanying description. Moreover, number portability status may take priority over all mobile subscriber status information, such as current registration status for dual-mode or dual handset subscribers. Giving priority to number portability status information over other mobile subscriber status information avoids unnecessary processing once it is determined that a DN is ported out to another network.

In one embodiment, if the original received message is determined to be an SRI message in step 632, then a new SRI-Ack is created and encoded in step 634 using, in part, the routing information returned from PMM database 430 lookup, and this new message is subsequently routed from PMM node 200 back to GSM MSC 106, as shown in FIG. 3. If the original received message is determined not to be an SRI message. In step 633, it is determined whether the message is an IS-41 LocReq message. If the message is an IS-41 LocReq message, then a LocReq RR message that includes the routing information obtained from PMM database 430 lookup operation is sent from PMM node 200 back to the requesting MSC in step 636. For example, as shown in FIGS. 2A and 2B, a LocReq RR message is sent to IS-41 MSC 102. If the message is not an SRI or a LocReq, control proceeds to step 630, where the message is routed based on the information extracted from the matching entry in PMM database 430.

Once again, it will be appreciated that with SS7 TCAP-based signaling messages, message type may be determined through examination of a TCAP OP code value contained within the message. Although new message creation is described using the example of an SRI or LocReq message, it will be appreciated that a PMM node 200 may be adapted to trigger the creation of a new signaling message in response to the receipt and processing of many other types of mobile signaling messages that are defined and currently employed within GSM, PCS, and IS-41 wireless communication networks, for example, and PMM node 200 may be adapted to accommodate any number of signaling message types.

Referring again to FIG. 5A, PMM database 430 includes migration status 518, a handset mode field 520 that indicates whether a subscriber is a dual mode subscriber, a GSM-only subscriber or an IS-41-only subscriber, and a GSM registration status field 522 to indicate whether the subscriber is GSM registered. A GSM subscriber may be an existing IS-41 subscriber who migrates to GSM service and does not keep his or her IS-41 handset. GSM subscribers may have a DN within a range designated for IS-41 DNs or may be new GSM-only subscribers who are given directory numbers in a range that may result in HLR queries from an IS-41 MSC. GSM-only subscribers may have a DN outside of the IS-41 ranges, which will not result in HLR queries from IS-41 MSCs. IS-41-only subscribers are simply subscribers of IS-41 service only.

In addition to handset mode field 520, the GSM entries in PMM database 430 for dual mode subscribers may include a populated GSM registration status field 522. Again, GSM registration status field 522 indicates whether or not a subscriber is GSM registered. A subscriber may become GMS registered in response to activation of the subscriber's GSM phone. Registration status is preferably only tracked for dual mode subscribers. For other types of subscribers, this field may be blank. The example illustrated in PMM database 430 does not store the IS-41 registration status of a mobile subscriber, indicating the preferred configuration for networks in which dual mode subscribers use separate handsets for each subscription. In networks in which dual mode subscribers use the same phone for both subscriptions, the IS-41 registration status may be stored in addition to the GSM registration status in PMM database 430. Methods for tracking the registration status of subscribers are described in U.S. patent application Ser. No. 10/405,859 (referred to above), which also has the same assignee as the present application and is incorporated herein by reference, and thus is not described here in detail.

Figure 7:
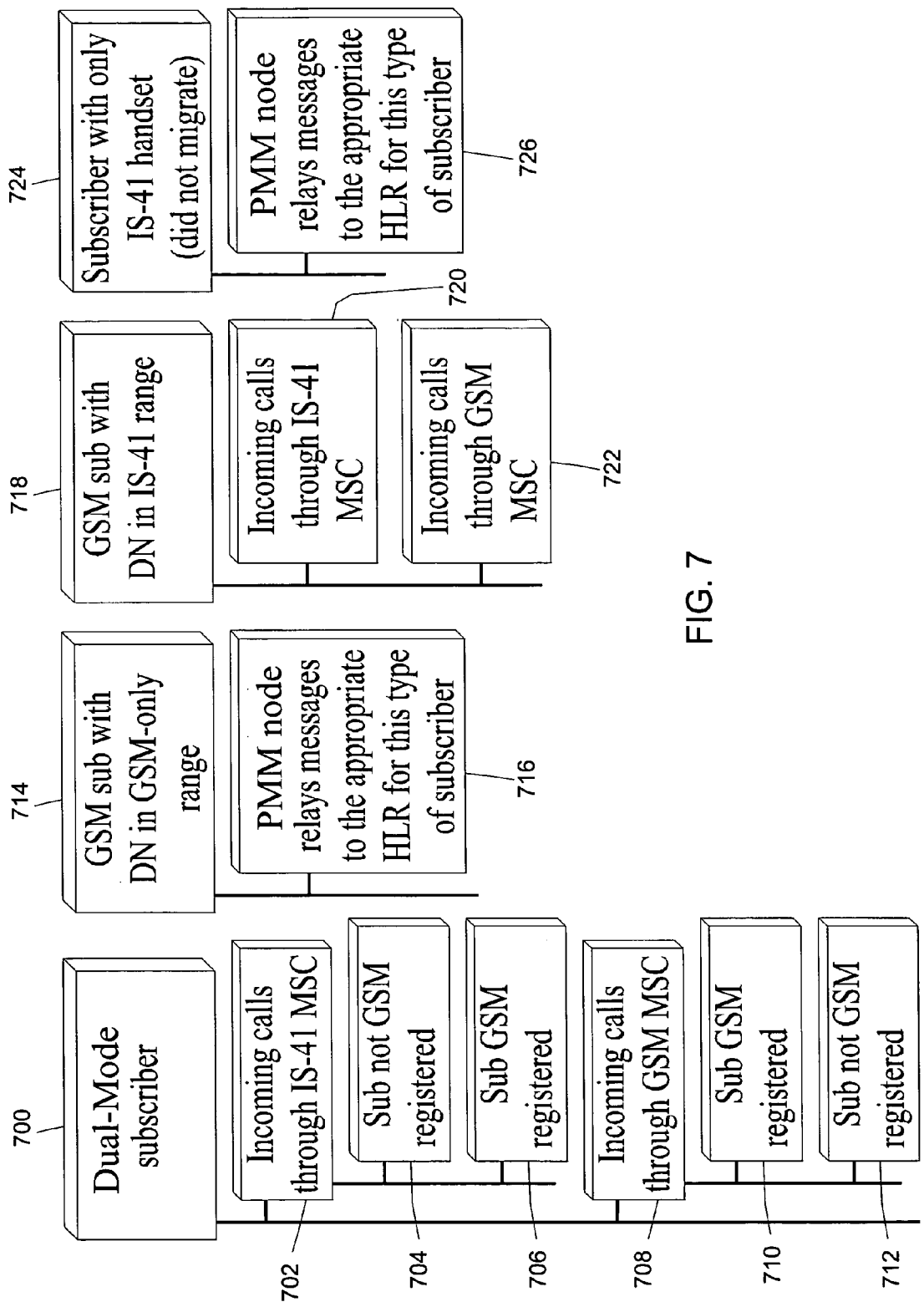
FIG. 7 is a block diagram illustrating exemplary mobile terminated call scenarios that may be handled or processed by the PMM node according to another aspect of the subject matter disclosed herein.

Once the subscriber's registration status is tracked in PMM database 430, PMM node 200 may process location query messages for calls to a variety of different subscriber types in connection with a migration analysis once it has been determined that the subscriber is not ported out. FIG. 7 is a block diagram illustrating exemplary mobile terminated call scenarios that may be handled or processed by PMM node 200. Referring to FIG. 7, block 700 represents exemplary processing for dual mode subscribers. As stated above, a dual mode subscriber may be an existing IS-41 subscriber who has migrated to GSM and kept the IS-41 service or a new subscriber of both IS-41 and GSM service. Within category 700, incoming calls may originate from an IS-41 MSC, as indicated by block 702. For such cases, processing varies depending on whether or not the subscriber is GSM registered, as indicated by blocks 704 and 706. In addition, calls for dual mode subscribers may originate from a GSM MSC, as indicated by block 708. In this category, the subscriber may be GSM registered, as indicated by block 710, or not GSM registered, as indicated by block 712.

Block 714 represents the category of processing for GSM-only subscribers having directory numbers outside of IS-41 ranges. This category includes new subscribers of GSM service or migrated subscribers who discontinue their IS-41 service. For these subscribers, PMM node 200 simply relays the messages to the appropriate GSM HLR as indicated by block 716. Category 718 represents processing for GSM subscribers having directory numbers within IS-41 ranges. For example, such subscribers may have migrated to GSM from IS-41 and kept their former IS-41 directory numbers. For such cases, processing varies depending on whether the call originates from an IS-41 MSC as indicated by block 720 or a GSM MSC as indicated by block 722. Finally, block 724 represents exemplary processing for subscribers with only an IS-41 handset who have not migrated to GSM service. In this situation, PMM node 200 preferably relays the messages to the appropriate IS-41 HLR, as indicated by block 726.

Figure 8:
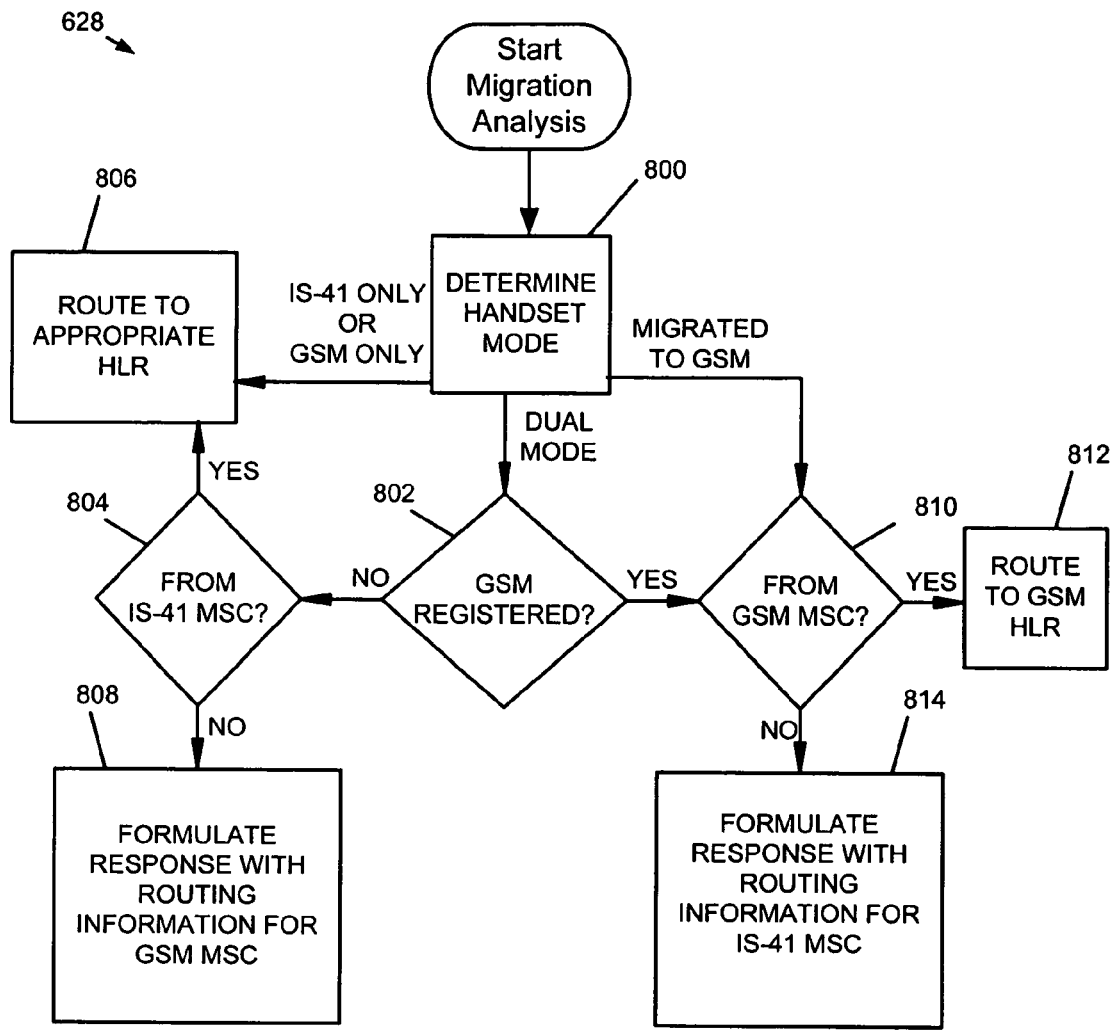
FIG. 8 is a flow chart illustrating exemplary processing steps that may be performed by the PMM node for performing migration analysis according to another aspect of the subject matter disclosed herein.

FIG. 8 is a flow chart illustrating exemplary processing steps that may be performed by PMM 200 for performing migration analysis, indicated by step 628 of FIG. 6C. Referring to FIG. 8 and recalling that it has been determined in step 626 of FIG. 6C that the DN is in PMM database 430 and is indicated as not ported, in step 800, the handset mode is extracted from PMM database 430. If the subscriber is a dual mode subscriber, control proceeds to step 802 where PMM support module 428 determines whether the subscriber is GSM registered. If the subscriber is not GSM registered, control proceeds to step 804 where it is determined whether the location query message originated from an IS-41 MSC. If the message originated from an IS-41 MSC, the message is simply routed to the appropriate IS-41 HLR, as indicated by step 806. If the message did not originate from an IS-41 MSC, control proceeds to step 808 where PMM node 200 formulates and sends a response to the GSM MSC that originated the message. The response preferably has routing information, such as a special prefix added to a mobile identification number that will be used to route the call to a specific IS-41 MSC. Alternatively, the GSM MSC may simply route the call to a default IS-41 MSC.

Returning to step 802, for dual mode subscribers, if the subscriber is determined to be GSM registered, control proceeds to step 810 where PMM support module 428 determines whether the message originated from a GSM MSC. If the message originated from a GSM MSC, control proceeds to step 812 where the message is routed to the appropriate GSM HLR. If the message did not originate from a GSM MSC, control proceeds to step 814 where PMM node 200 formulates and sends a response to the IS-41 MSC with routing information to route the call to the appropriate GSM MSC, such as the special prefix mentioned above.

Returning to step 800, if the subscriber is determined to be a GSM subscriber with a DN within an IS-41 range of DNs, control proceeds to step 810 where it is determined whether the location query message is from a GSM MSC. If the message is from a GSM MSC, the message is routed to the appropriate GSM HLR, as indicated in step 812. If the message is not from a GSM MSC, PMM node 200 formulates and sends a response to the IS-41 MSC with routing information to direct the IS-41 MSC to route the call to the appropriate GSM MSC. Once again, in an alternate embodiment of the invention, the prefix may be omitted and the IS-41 MSC may simply route the call to a GSM MSC by default.

Returning again to step 800, if the subscriber type is determined to be IS-41-only with a directory number within an IS-41 range or GSM-only with a directory number within a GSM range, control proceeds to step 806 where GTT support module 432 extracts the appropriate HLR address from GTT database 434 and routing function 410 routes the message to the appropriate IS-41 or GSM HLR. In this example, since the directory numbers are exclusively within IS-41 or GSM ranges, it is assumed that the location query messages originated from the MSC of the appropriate type.

Thus, as described above, PMM node 200 is capable of routing messages to the appropriate destination and for rerouting calls in a network that includes dual mode subscribers, migrated subscribers, new subscribers of the migrated-to signaling protocol, and existing subscribers of the migrated-from signaling protocol that do not switch application layer mobile signaling protocols. In addition, PMM node 200 is adapted to prevent a signaling message associated with mobile subscriber that has been ported out of a service provider's network from unnecessarily accessing the service provider's HLR resources.

While the examples above relate primarily to IS-41 and GSM signaling protocols, the present invention is not limited to these protocols. The methods and systems for processing and routing signaling messages described herein are applicable to any network in which subscribers use multiple application layer mobile signaling protocols with the same DN.

In addition, in the examples described above, SS7 and IP links are used to carry the application layer mobile signaling protocols. However, the present invention is not limited to using SS7 or IP transport. The methods and systems described herein for facilitating migration between application layer mobile signaling protocols may be used with any underlying transport capable of carrying an application layer mobile signaling protocol. Additional examples, other than IP and SS7, include any of the transport protocols specified for third generation mobile telecommunications networks, for example, as described in the various technical documents available at www.3gpp.org.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for processing messages in a mobile communications network, the method comprising:
 at a first network node:
 (a) receiving a first message relating to a communication in a mobile communications network, the first message including a called directory number;
 (b) performing a lookup in a first database based on the called directory number to determine whether a called party has been ported out of a first network and to determine a migration status of the called party;
 (c) in response to determining that the called party has been ported out of the first network, formulating a first reply message including first routing information from the first database, the first routing information indicating a second network to which the called party has been ported; and
 (d) in response to determining that the called party has not been ported out, formulating a second reply message including second routing information from the first database, the second routing information corresponding to the determined migration status.

2. The method of claim 1 wherein receiving a first message includes receiving a signaling system 7 (SS7) signaling message.

3. The method of claim 2 wherein receiving an SS7 signaling message includes receiving an Internet protocol-encapsulated SS7 signaling message.

4. The method of claim 1 wherein receiving a first message includes receiving a send routing information (SRI) signaling message.

5. The method of claim 1 wherein receiving a first message includes receiving a send location request (LocReq) signaling message.

6. The method of claim 1 wherein receiving a first message includes receiving at least one of an SRI signaling message and a LocReq signaling message that corresponds to a session initiation protocol (SIP) initiated call.

7. The method of claim 4 wherein formulating a first reply message including routing information indicating a second network to which the called party has been ported includes generating an SRI-Acknowledge (SRI-Ack) signaling message.

8. The method of claim 5 wherein formulating a first reply message including routing information indicating a second network to which the called party has been ported includes generating a location request return result (LocReq RR) signaling message.

9. The method of claim 1 wherein the called directory number includes a mobile subscriber ISDN (MSISDN) number.

10. The method of claim 1 wherein performing a lookup in the first database includes performing a lookup in the first database based on a mobile service entity type in the first message.

11. The method of claim 1 wherein formulating a first reply message including first routing information from the first database includes including a routing number (RN) value obtained from the first database in the first reply message.

12. The method of claim 1 wherein performing a lookup in a first database includes performing a lookup in an exceptions-based database having entries indexed by directory numbers that are exceptions to called directory numbers used to index entries in a second database.

13. The method of claim 12 comprising in response to failing to locate an entry corresponding to the called directory number in the first database, performing a second lookup in the second database based on the called directory number.

14. The method of claim 1 wherein formulating a second reply message including second routing information corresponding to the determined migration status at the first node comprises:
 (a) determining whether the directory number is registered according to a first application layer mobile signaling protocol; and
 (b) in response to the directory number being registered in the first application layer mobile signaling protocol, formulating the second reply message to include second routing information indicating a node in the first network that corresponds to the first application layer mobile signaling protocol and that is serving the called directory number.

15. The method of claim 14 comprising, in response to determining that the directory number is not registered according to the first application layer mobile signaling protocol, formulating the second reply message to include second routing information indicating a node in the first network that corresponds to a second application layer mobile signaling protocol and that is serving the called directory number.

16. The method of claim 15 wherein the first application layer mobile signaling protocol includes the Global System for Mobile communications (GSM) protocol and the second application layer mobile signaling protocol includes the Interim Standard-41 (IS-41) protocol.

17. The method of claim 15 wherein the first application layer mobile signaling protocol includes the IS-41 protocol and the second application layer mobile signaling protocol includes the GSM protocol.

18. The method of claim 14 comprising, in response to determining that the called directory number is registered according to the first application layer mobile signaling protocol, formulating the second reply message to include second routing information indicating an MSC of the first application layer mobile signaling protocol.

19. The method of claim 14 comprising, in response to determining that the called directory number is not registered according to the first application layer mobile signaling protocol, formulating the second reply message to include second routing information indicating an MSC of a second application layer mobile signaling protocol.

20. The method of claim 1 comprising analyzing information in the first message to determine whether mobile number portability and migration processing is required for the first message.

21. The method of claim 20 wherein analyzing information in the first message to determine whether number portability and migration processing is required includes examining at least one of a translation type (TT) parameter, a global title indicator (GTI) parameter, a numbering plan (NP) parameter, a nature of address indicator (NAI) parameter, and a transaction capabilities application part (TCAP) or mobile application part (MAP) operation code parameter in the first message.

22. A method for processing messages in a mobile communications network, the method comprising:
 at a first network node:
 (a) receiving a first message relating to a communication in a mobile communications network, the first message including a called directory number;
 (b) locating number portability and migration status information for the called directory number, wherein the migration status information includes an indicator that indicates whether a called party of a first service type has migrated to a second service type; and
 (c) processing the first message in a manner that gives priority to the number portability status information.

23. A method for processing messages in a mobile communications network, the method comprising:
 at a first network node:
 (a) receiving a first message relating to a communication in a mobile communications network, the first message being formatted according to one of a first and a second application layer mobile signaling protocol, the first message including a called directory number and requesting routing information for a dual-mode handset;
 (b) performing a lookup in a first database based on the called directory number to determine whether a called party has been ported out of a first network; and
 (c) in response to determining that the called party has been ported out of the first network, formulating a first reply message according to a same one of the first and the second application layer mobile signaling protocol and including first routing information from the first database, the first routing information indicating a second network to which the called party has been ported.

24. A routing node for processing messages in mobile communications network, the routing node comprising:
- (a) a communication module for receiving a first message relating to a call in a mobile communications network, the first message including a called directory number;
- (b) a first database for storing entries corresponding to directory numbers, at least some of the entries including number portability and migration status information for the directory numbers; and
- (c) a database services module operatively associated with the first database for:
  - (i) performing a lookup in the first database based on the called directory number to determine whether a called party has been ported out of a first network and to determine a migration status of the called party; and
  - (ii) in response to determining that the called party has been ported out of the first network, formulating a first reply message including first routing information from the first database, the routing information indicating a second network to which the called party has been ported; and
  - (iii) in response to determining that the called party has not been ported out, formulating a second reply message including second routing information from the first database, the second routing information corresponding to the determined migration status.

25. The routing node of claim 24 wherein the communication module includes a signaling system 7 (SS7) message transfer part (MTP) capable link interface module (LIM).

26. The routing node of claim 24 wherein the communication module includes an Internet protocol capable data communication module (DCM).

27. The routing node of claim 24 comprising logic configured to process a send routing information (SRI) message as the first message.

28. The routing node of claim 26 comprising logic configured to process a send location request (LocReq) signaling message as the first message.

29. The routing node of claim 24 comprising logic configured to process at least one of an SRI signaling message and a LocReq signaling message that corresponds to a session initiation protocol (SIP) initiated call.

30. The routing node of claim 24 comprising logic configured to formulate an SRI-Acknowledge (SRI-Ack) message as at least one of the first and second reply messages.

31. The routing node of claim 24 comprising logic configured to formulate a location request return result (LocReq RR) message as at least one of the first and second reply messages.

32. The routing node of claim 24 wherein the first database comprises an exception-based database having entries indexed by directory numbers that are exceptions to called directory numbers used to index entries in a second database.

33. The routing node of claim 32 wherein the second database comprises entries having called directory numbers, at least some of which are not ported-out or migrated.

34. The routing node of claim 33 wherein the database services module searches the first database, and, in response to failing to locate an entry in the first database, searches the second database.

35. The routing node of claim 24 wherein the database services module performs a lookup in the first database based on a mobile service entity type in the first message.

36. The routing node of claim 24 wherein the database services module uses a routing number (RN) value obtained from the first database to formulate the first reply message.

37. The routing node of claim 24 wherein the database services module formulates the second reply message including second routing information corresponding to the determined migration status by:
- (a) determining whether the directory number is registered according to a first application layer mobile signaling protocol; and
- (b) in response to the directory number being registered in the first application layer mobile signaling protocol, formulating the second reply message to include second routing information indicating a node in the first network that corresponds to the first application layer mobile signaling protocol and that is serving the called directory number.

38. The routing node of claim 37 wherein, in response to determining that the directory number is not registered according to the first application layer mobile signaling protocol, the database services module formulates the second reply message to include second routing information indicating a node in the first network that corresponds to a second application layer mobile signaling protocol and that is serving the called directory number.

39. The routing node of claim 38 wherein the first application layer mobile signaling protocol includes the Global System for Mobile communications (GSM) protocol and the second application layer mobile signaling protocol includes the Interim Standard-41 (IS-41) protocol.

40. The routing node of claim 38 wherein the first application layer mobile signaling protocol includes the IS-41 protocol and the second application layer mobile signaling protocol includes the GSM protocol.

41. The routing node of claim 37 wherein, in response to determining that the called directory number is registered according to the first application layer mobile signaling protocol, the database services module formulates the second reply message to include second routing information indicating an MSC of the first application layer mobile signaling protocol.

42. The routing node of claim 37 wherein, in response to determining that the called directory number is not registered according to the first application layer mobile signaling protocol, the database services module formulates the second reply message to include second routing information indicating an MSC of a second application layer mobile signaling protocol.

43. The routing node of claim 24 wherein the database services module includes logic configured to analyze information in the first message to determine whether mobile number portability and migration processing is required for the first message.

44. The routing node of claim 43 wherein the logic configured to analyze information in the first message to determine whether mobile number portability and migration processing is required for the first message determines whether number portability processing is required by examining at least one of a translation type (TT), global title indicator (GTI), numbering plan (NP), and nature of address (NAI) parameters in the first message.

45. A routing node for processing messages in a mobile communications network, comprising:
- (a) a communication module for receiving a first message relating to a call in a mobile communications network, the first message including a called directory number;

(b) a first database containing entries corresponding to number portability and migration status information of directory numbers, wherein the migration status information includes an indicator that indicates whether a called party of a first service type has migrated to a second service type; and (c) a database services module for processing the first message in a manner that gives priority to the number portability status information.

* * * * *